(12) United States Patent
Lee et al.

(10) Patent No.: US 10,940,565 B2
(45) Date of Patent: Mar. 9, 2021

(54) LOW-MELTING NICKEL-BASED ALLOYS FOR BRAZE JOINING

(71) Applicant: OERLIKON METCO (US) INC., Westbury, NY (US)

(72) Inventors: Dongmyoung Lee, Mayfield Heights, OH (US); Gerhard E. Welsch, Cleveland Heights, OH (US)

(73) Assignee: OERLIKON METCO (US) INC., Westbury, NY (US)

( * ) Notice: Subject to any disclaimer, the term of this patent is extended or adjusted under 35 U.S.C. 154(b) by 64 days.

(21) Appl. No.: 14/629,302

(22) Filed: Feb. 23, 2015

(65) Prior Publication Data
US 2015/0239073 A1    Aug. 27, 2015

Related U.S. Application Data

(60) Provisional application No. 61/942,757, filed on Feb. 21, 2014.

(51) Int. Cl.
*B23K 35/30* (2006.01)
*C22C 19/03* (2006.01)

(52) U.S. Cl.
CPC .......... *B23K 35/3033* (2013.01); *B23K 35/30* (2013.01); *C22C 19/03* (2013.01); *Y10T 403/479* (2015.01)

(58) Field of Classification Search
CPC .... B23K 35/30; B23K 35/3033; C22C 19/03; Y10T 403/479
See application file for complete search history.

(56) References Cited

U.S. PATENT DOCUMENTS

| | | | |
|---|---|---|---|
| 2,880,086 A * | 3/1959 | Cape | B23K 35/3033 420/459 |
| 3,428,442 A * | 2/1969 | Yurasko, Jr. | B22F 1/025 427/427 |
| 4,075,009 A * | 2/1978 | Stern | B23K 35/3033 420/455 |
| 4,135,656 A | 1/1979 | Stern | |
| 4,314,661 A | 2/1982 | DeCristofaro et al. | |
| 4,402,742 A | 9/1983 | Pattanaik | |
| 4,410,604 A | 10/1983 | Pohlman et al. | |
| 6,656,292 B1 | 12/2003 | Rabinkin et al. | |
| 7,392,930 B2 | 7/2008 | Rangaswamy et al. | |
| 7,455,811 B2 | 11/2008 | Sjodin | |
| 8,691,142 B2 | 4/2014 | Shin et al. | |
| 2006/0090820 A1 | 5/2006 | Rabinkin et al. | |
| 2009/0110955 A1* | 4/2009 | Hartmann | B23K 1/0012 428/684 |
| 2009/0258249 A1* | 10/2009 | Sakamoto | B23K 35/30 428/678 |
| 2010/0028716 A1* | 2/2010 | Nuetzel | B23K 35/3033 428/679 |
| 2010/0055495 A1 | 3/2010 | Sjodin | |

FOREIGN PATENT DOCUMENTS

JP        2010284722        * 12/2010

OTHER PUBLICATIONS

1998. "Brazing", Metals Handbook Desk Edition, Joseph R. Davis (Year: 1998).*
Tokyo Braze Co., Ltd. , retrieved from http://www.tokyobraze.co.jp/en Feb. 23, 2015.

* cited by examiner

*Primary Examiner* — Nicholas A Wang
(74) *Attorney, Agent, or Firm* — Greenblum & Bernstein, P.L.C.

(57) ABSTRACT

A braze alloy composition includes the formula:

$$Ni_aFe_bP_cB_dSi_eC_fX_g$$

wherein X is selected from the group consisting of Cu, Nb, Hf, Mo, W, V, Ta, Y, La, rare earth elements, Al, Ru, Pd, Cr, Mn, Co, Be, and mixtures thereof, a, b, c, d, e, f, and g are atom % of, respectively, Ni, Fe, P, B, Si, C, and X, and wherein $75 \leq ((a+b)-g) \leq 90$, $a>b$, $10 \leq c+d+e+f \leq 25$, and $g<10$.

19 Claims, No Drawings

LOW-MELTING NICKEL-BASED ALLOYS FOR BRAZE JOINING

RELATED APPLICATION

This application claims priority from U.S. Provisional Application No. 61/942,757, filed Feb. 21, 2014, the subject matter of which is incorporated herein by reference in its entirety.

TECHNICAL FIELD

This application relates to economical filler-alloy compositions for brazing metal or metal alloys, such as stainless steels and other iron-based alloys and nickel-based super alloys. For parts made of iron-based alloys or nickel•based alloys, the filler-alloy can provide a robust joining medium with good corrosion resistance by wetting the surface of base materials and forming metallurgical bonds, e.g., by interdiffusion of filler-alloy elements with those of the base material.

BACKGROUND ART

Nickel based filler alloys have been used for the brazing of stainless steels, alloy- and carbon-steels as well as pure nickel and nickel-based (super) alloys. The filler alloys offer a high bonding strength at low and elevated temperatures and excellent corrosion resistance. The conventional filler alloys called B—Ni series by the American Welding Society (AWS) are based on Cr—Ni, B—Si and Ni—P alloy systems. The systems use the melting-point-depressing elements B, P and Si. The melting temperatures of alloys of the Ni—Cr—B—Si systems range from 970° C. to 1100° C. and in the Ni—P system from 870° C. to 950° C. The recommended brazing temperatures for present-art filler-alloys based on these systems are around 1100° C. and 1000° C., respectively.

In order to join materials by filler alloys, the materials are heated to melt and react with enclosed filler alloys. During the exposure to elevated temperatures the base materials remain in a solid state, however, their microstructures and properties are affected by diffusion of the alloy and impurity elements and by grain growth and precipitate-phase coarsening. These are unwanted because they impair the mechanical strength properties as well as degrade corrosion and oxidation resistance of the base materials. A lower brazing temperature at which grain growth and phase-coarsening is minimized is usually desired.

The $Ni_{81}P_{19}$ composition (the numbers are in atom percent) has the commercial name N—Ni6. It is the lowest-melting eutectic binary alloy of the Ni—P system with a melting temperature of 870° C. The binary Ni—P alloys are rarely used because their high P-concentrations generate a high vapor pressure of phosphorus during brazing. The vaporization results in a depletion of phosphorus in the filler alloy making it hypo-eutectic and causing the precipitation of solid high-melting nickel at the brazing temperature. The vaporized phosphorus can contaminate the brazing chamber and/or react with the base material at locations other than the braze-joint. For this reason filler alloys of different composition are often used, e.g., the alloy B-Ni1 with a composition of Ni-3B-7Cr-3Fe-14B-8Si or alloy B-Ni2 with a composition of Ni-7Cr-3Fe-14B-8Si, despite their higher melting temperatures of over 970° C. to 1038° C. The recommended brazing temperature for these alloys of about 1100° C. carries a high probability of recrystallization and excessive grain growth, unwanted precipitate-coarsening and sensitization of remaining grain boundaries of stainless steel base material. To prevent these unwanted effects on the microstructures of the base materials, industry continually demands lower-melting filler alloys. These can be achieved with a compromise solution for the concentrations of melting point depressants: (1) to keep their concentrations at low levels to minimize intermetallic phase formations and (2) high enough to provide the filler alloy with a sufficiently low liquidus temperature, so brazing can be done at a temperature—typically some 50° C. higher than the filler-alloy's liquidus temperature.

SUMMARY

Embodiments described herein relate to low-melting nickel (iron)-based filler alloys that can be used to braze, join, fill, and/or repair individual parts formed from at least one of unalloyed nickel, nickel with an alloy content less than 10 atom %, nickel based alloys, nickel based super alloys, ferritic alloy steels, austenitic steel, maraging steel, iron alloys, copper alloys, or cobalt alloys.

In some embodiments, the filler or braze alloy can have a composition with the formula:

$Ni_aFe_bP_cB_dSi_eC_fX_g$ wherein X is selected from the group consisting of Cu, Nb, Hf, Mo, W, V, Ta, Y, La, rare earth elements, Al, Ru, Pd, Cr, Mn, Co, Be, and mixtures thereof, a, b, c, d, e, f, and g are the atom % of, respectively, Ni, Fe, P, B, Si, C, and X, and wherein 75≤((a+b)−g)≤90, a>b, 10≤c+d+e+f≤25, and g<10. The braze alloy can have a liquidus and/or solidus temperature less than about 950° C., less than about 920° C., or less than about 900° C.

In some embodiments, at least two or three of c, d, e, or f is not 0. In other embodiments, c>d>e>f and/or c+f>d>e. In still other embodiments, a+b+c+d+e+f+g can be about 100.

In yet other embodiments, a is about 40 to about 80 and/or b is about 10 to about 40.

Other embodiments described herein relate to a brazed construction that includes a plurality of individual parts and a brazed filler alloy joining, filling and/or repairing at least one of the individual parts. The individual parts can include at least one of unalloyed nickel, nickel with an alloy content less than 10 atom %, nickel based alloys, nickel based super alloys, ferritic alloy steels, austenitic steel, maraging steel, iron alloys, or copper alloys, cobalt alloys.

In some embodiments, the filler alloy prior to brazing can include, by atom %, about 40% to about 80% Ni, about 10% to about 40% Fe, and about 10% to about 25% combined of at least two of P, B, Si, or C.

In other embodiments, the filler alloy prior to brazing can include a composition having the formula:

$Ni_aFe_bP_cB_dSi_eC_fX_g$ wherein X is selected from the group consisting of Cu, Nb, Hf, Mo, W, V, Ta, Y, La, rare earth elements, Al, Ru, Pd, Cr, Mn, Co, Be, and mixtures thereof, a, b, c, d, e, f, and g are atom % of, respectively, Ni, Fe, P, B, Si, C, and X, and wherein 75≤((a+b)−g)≤90, a>b, 10≤c+d+e+f≤25, and g<10.

In some embodiments, at least two or three of c, d, e, or f is not 0. In other embodiments, c>d>e>f and/or c+f>d>e. In still other embodiments a+b+c+d+e+f+g can be about 100.

In still other embodiments, the braze alloy can have a liquidus temperature below 900° C.

DETAILED DESCRIPTION

When introducing elements of various embodiments described herein, the articles "a," "an," "the," and "said" are intended to mean that there are one or more of the elements, unless otherwise indicated. The terms "comprising," "including," and "having" are intended to be inclusive, and mean that there may be additional elements other than the listed elements. As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it may be related. Accordingly, a value modified by a term such as "about" is not limited to the precise value specified. In some instances, the approximating language may correspond to the precision of an instrument for measuring the value.

As used herein, the term "liquidus temperature" generally refers to a temperature at which an alloy is transformed from a solid into a molten or viscous state. The liquidus temperature specifies the maximum temperature at which crystals can co-exist with the melt in thermodynamic equilibrium. Above the liquidus temperature, the alloy is homogeneous, and below the liquidus temperature, more and more crystals begin to form in the melt with time, depending on the alloy. Generally, an alloy, at its liquidus temperature, melts and forms a seal between two components to be joined.

The liquidus temperature can be contrasted with a "solidus temperature". The solidus temperature quantifies the point at which a material completely solidifies (crystallizes). The liquidus and solidus temperatures do not necessarily align or overlap. If a gap exists between the liquidus and solidus temperatures, then within that gap, the material consists of solid and liquid phases simultaneously (like a "slurry").

"Sealing" is a function performed by a structure that joins other structures together, to reduce or prevent leakage through the joint, between the other structures. The seal structure may also be referred to as a "seal."

Typically, "brazing" uses a braze material (usually an alloy) having a lower liquidus temperature than the melting points of the components (i.e., their materials) to be joined. The braze material is brought slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy, for a particular application, should withstand the service conditions required, and melts at a lower temperature than the base materials; or melts at a very specific temperature.

As used herein, the term "brazing temperature" refers to a temperature to which a brazing structure is heated to enable a braze alloy to wet the components to be joined, and to form a braze joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

Embodiments described herein relate to low-melting nickel (iron)-based filler or brazing alloys that can be used to braze, join, fill and/or repair individual parts formed from at least one of unalloyed nickel, nickel with an alloy content less than 10 atom %, nickel based alloys, nickel based super alloys, ferritic alloy steels, austenitic steel, maraging steel, iron alloys, or cobalt alloys.

It was found that the addition of Fe to Ni along with the addition of a combination of metalloid elements P, B, Si, and/or C can decrease the melting temperature of Ni based brazing alloys. Nickel and iron form a complete solid solution in the gamma or austenite phase. The melting temperature of pure iron is decreased by the addition of P, C, B, and/or Si. These additives also decrease the melting temperature of pure nickel, which is one of the main alloy elements of austenitic stainless steels. Likewise, a decrease of the melting temperature is also achieved when one or more of P, C, B, and Si elements are added to binary solid solution Ni—Fe alloys. The combined effects of P, C, B, and Si alloyed with nickel-iron solid solution can also lower the melting temperature in such nickel (iron) based [Ni(Fe)—P—C—B—Si] alloys and be favorable for the brazing of iron and/or nickel based metals and/or alloys, such as stainless steels. Advantageously, the Ni(Fe)-based filler or brazing alloys described herein are lower in cost than Ni and Cu based brazing alloys shown, for example, in Table 2 and have enhanced compatibility with iron-based alloys, such as stainless steels.

In some embodiments, the Ni(Fe)-based filler or braze alloys can have a composition with the formula:

$Ni_a Fe_b P_c B_d Si_e C_f X_g$ wherein X is selected from the group consisting of Cu, Nb, Hf, Mo, W, V, Ta, Y, La, rare earth elements, Al, Ru, Pd, Cr, Mn, Co, Be, and mixtures thereof, a, b, c, d, e, f, and g are atom % of, respectively, Ni, Fe, P, B, Si, C, and X, and wherein $75 \leq ((a+b)-g) \leq 90$, $a>b$, $10 \leq c+d+e+f \leq 25$, and $g<10$ (e.g., $g<5$, $g<1$, or $g<0.1$).

In some embodiments, at least two or three of c, d, e, or f is not 0. In other embodiments, $c>d>e>f$ and/or $c+f>d>e$. In still other embodiments, $a+b+c+d+e+f+g$ can be about 100.

In other embodiments, the braze alloy can have liquidus and/or solidus temperatures less than about 950° C., less than about 920° C., less than about 900° C., or less than about 870° C.

In yet other embodiments, a is about 40 to about 80 and/or b is about 10 to about 40.

Table 1 lists an example of a low-melting nickel-rich Ni(Fe)-based brazing alloys. Here, the concentration of the majority alloy elements are about 40 to about 80 atom % Ni and about 10 to about 40 atom % Fe. The balance of 10-25 atom % is made up of three or more of the melting-point-depressing elements selected from the group consisting of P, C, B, and Si. Other substitutional alloy elements, such as Cu, Nb, Hf, Mo, W, V, Ta, Y, La, rare earth elements, Al, Ru, Pd, Cr, Mn, Co, Be, and mixtures thereof, can be substituted for portions of the majority components Fe and Ni. This can be done to form compositions that are closer and more compatible with composition of certain base materials, such as commercial austenitic stainless steels or ferritic stainless steels or maraging steels. Phosphorus is an essential alloy element for lowering the melting temperature of Ni-rich Ni(Fe) solid solution. It is combined with a combination of two or three other elements, such as C, B, Si. In particular, low-melting alloys of compositions described herein are advantageous in providing wetting and metallurgical bonding with the surfaces or interfaces of base materials. The tensile and shear strengths of brazed base materials will generally exceed 100 MPa and 50 MPa, respectively.

Specified or recommended brazing temperatures of the prior art alloys are mostly near or above 1100° C. (see, Ni-, Cu-, and Fe-based brazing alloys in Tables 2 and 3). Compared to the prior art brazing alloys for stainless steel, the brazing alloys described herein have melting temperatures that are less than 900° C. (see the Table 1). They start melting as low as near 865° C. and as high as in the low 900° C. to 950° C. range. Such alloys enable stainless steels to be brazed at temperatures less than 1000° C.

TABLE 1

Example of the low-melting Ni(Fe)-based brazing alloy

| | Composition (atom %) | | | | | Melting range (° C.) | |
|---|---|---|---|---|---|---|---|
| | Ni | Fe | C | P | Si | B | Solidus | Liquidus |
| 1 | 50 | 30 | 7 | 6 | 3 | 2 | 865 | 920 |

TABLE 2

The prior art Ni and Cu based brazing alloys

| | | | Melting Range (° C.) | | |
|---|---|---|---|---|---|
| | | Composition (atom %) | Solidus | Liquidus | Brazing Temperature (° C.) |
| Ni based | 1 | $Ni_{62.5}Cr_{13.1}B_{13.9}Si_{7.8}Fe_{2.6}$ | 970 | 1000 | 1065(1010-1175) |
| | 2 | $Ni_{81}P_9$ | 875 | 875 | 980(925-1095) |
| | 3 | $Ni_{68.6}Cr_{14.3}P_{17.1}$ | 890 | 890 | 1065(980-1095) |
| | 4 | $Ni_{57.9}Cr_{25.2}P_{16.9}$ | 880 | 950 | 1065(980-1095) |
| Cu based | 5 | 99.99% Cu | 1083 | 1083 | 1115-1150 |
| | 6 | $Cu_{84.3}Mn_{13.6}Ni_{2.1}$ | 970 | 990 | 1050 |

TABLE 3

The prior art Fe-based brazing alloys

| | | | | | | | | | | | | Melting Range (° C.) | | |
|---|---|---|---|---|---|---|---|---|---|---|---|---|---|---|
| | | | Composition (atom %) | | | | | | | | | | | |
| | Fe | Ni | Cr | Co | Mo | Mn | B | P | Si | C | Bal. | Sol. | Liq | Reference |
| 1 | 40.5 | 17.1 | 19.3 | | 1.0 | | 11.4 | 10.7 | — | | | 1030 | 1085 | http://www.tokyobraze.co.jp/origra2/ |
| 2 | 54.7 | 17.4 | 1.9 | | | 10.5 | | 15.5 | | | | 1137 (brazing temp.) | | U.S. Pat. No. 4,410,604 |
| 3 | 36 | 35 | 5 | | | | 17 | | 7 | | | 940 | 1015 | U.S. Pat. No. 4,402,742 |
| 4 | 43 | 30 | 4 | | | | 16 | | 7 | | | 968 | 1070 | |
| 5 | 44 | 30 | 6 | | | | 12 | | 8 | | | 967 | 1110 | |
| 6 | 68 | | 5 | 5 | | | 12 | — | 10 | — | | 1110 | 1174 | U.S. Pat. No. 6,656,292 |
| 7 | 75 | | | | | | 15 | | 10 | | | 1042 | 1148 | U.S. 2006/0090820 |
| 8 | 52.8 | 11.8 | 17.4 | | 1.0 | 1.6 | 0.1 | 8.4 | 6.8 | 0.1 | | 1055 | 1100 | U.S. 2010/0055495 |
| 9 | 34 | 15 | 28 | | | | 10 | 12 | | 1 | | 1074 | 1104 | U.S. Pat. No. 7,392,930 |

In some embodiments, the filler or brazing alloys can be produced in the form of powders, ribbons, foils, or wires, according to well known techniques. Powder can be fabricated by ball-milling or gas-atomizing methods. The ribbons, foils, or wires can be synthesized by melt-spinning. Powder, ribbon, foil, or wire preforms can be inserted and fed between individual parts to be brazed, joined, filled and/or repaired. Because the compositions are similar to those of stainless steels, they can be applied to the brazing of stainless steels at a processing temperature of around 1000° C.

In some embodiments, the Ni(Fe)-based brazing alloys can be used to braze, join, fill, and/or repair at least one or more individual parts of unalloyed nickel and nickel base materials with low alloy contents of less than 10 atom percent, nickel-based base alloys, including nickel superalloys, ferritic alloy steels including ferritic stainless steels, austenitic steels, maraging steels, iron alloys, copper alloys, or cobalt alloys. Advantageously, the use of Ni(Fe)-based brazing alloys described herein can minimize recrystallization and grain growth in the brazed base metals or alloys.

The individual parts to be brazed, joined, filled and/or repaired can include complex air- and water-tight structures or articles, such as reactors, reactor plates, separators, columns, heat exchangers, honeycomb panels, or equipment for chemical plants, food plants, as well as aerospace and maritime industries. The brazed joints and the brazed components (e.g., stainless steel plates) can have high joint strength and excellent corrosion resistance, in part enabled by the homogenization of the braze alloy joints at lower temperatures compared to those formed with conventional Fe-, Ni-, and Cu based brazing alloys and in part aided by reduced or absent recrystallization, grain growth and phase transformation of the microstructure of braze-joined base alloys.

In some embodiments, a brazing method using the Ni(Fe)-based brazing alloys may either comprise brazing the article assembled with all its parts at the same time or the article may be brazed in a stepwise fashion where parts are first assembled and brazed together, and then assembled with further parts and brazed together, and so on using the same type of brazing material in each brazing cycle.

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

What is claimed is:

1. A braze alloy composition consisting of the formula:

$$Ni_aFe_bP_cB_dSi_eC_fX_g$$

wherein X is selected from the group consisting of Cu, Nb, Hf, Mo, W, V, Ta, Y, La, rare earth elements, Al, Ru, Pd, Cr, Mn, Co, Be, and mixtures thereof, a, b, c, d, e, f, and g are atom % of, respectively, Ni, Fe, P, B, Si, C, and X, and wherein a is about 50 to about 80, b is about 10 to about 40, 75≤((a+b)−g)≤90, 10≤c+d+e+f≤25, f>e>d, c>e>d, and g<1;

the braze alloy having a liquidus and/or solidus temperature less than 900° C.

2. The braze alloy of claim 1, wherein a+b+c+d+e+f+g is about 100.

3. The braze alloy of claim 1, wherein at least three of c, d, e, or f is not 0.

4. The braze alloy of claim 3, wherein f>c>e>d.

5. The braze alloy of claim 1, being in foil form.

6. The braze alloy of claim 1, being in powder form.

7. The braze alloy composition of claim 1 which is of the formula:

$$Ni_{50}Fe_{30}P_6B_2Si_3C_7$$

8. The brazed construction of claim 1, wherein the liquidus and solidus temperatures are less than 900° C.

9. The brazed construction of claim 1, wherein X is at least one of Cr, Mn, or Mo.

10. A method for making a brazed construction comprising a plurality of individual parts and a brazed filler alloy, the method comprising joining, filling and/or repairing at least one of the individual parts with a braze alloy of claim 1, wherein the individual parts include at least one of unalloyed nickel, nickel with an alloy content less than 10 atom %, nickel based alloys, nickel based super alloys, ferritic alloy steels, austenitic steel, maraging steel, iron alloys, copper alloys, or cobalt alloys.

11. The method for making the brazed construction of claim 10, wherein at least three of c, d, e, or f is not 0.

12. The method for making the brazed construction of claim 10, wherein f>c>e>d.

13. The method for making the brazed construction of claim 10, wherein the liquidus and solidus temperatures are less than 900° C.

14. The method of making the brazed construction of claim 10 wherein X is at least one of Cr, Mn, or Mo.

15. The method of making the brazed construction of claim 14, wherein at least three of c, d, e, or f is not 0.

16. The method of making the brazed construction of claim 14, wherein f>c>e>d.

17. The method of making the brazed construction of claim 14, wherein the liquidus and solidus temperatures are less than 900° C.

18. The method of making the brazed construction of claim 10 wherein a+b+c+d+e+f+g is about 100.

19. The method of making the brazed construction of claim 10 wherein the braze alloy composition is of the formula:

$$Ni_{50}Fe_{30}P_6B_2Si_3C_7$$

* * * * *